INVENTOR.
JOHN S. FROST
BY Robert G. Rogers
ATTORNEY

INVENTOR.
JOHN S. FROST

United States Patent Office 3,448,334
Patented June 3, 1969

3,448,334
MULTICOLORED E.L. DISPLAYS USING EXTERNAL COLORED LIGHT SOURCES
John S. Frost, Santa Ana, Calif., assignor to North American Rockwell Corporation, a corporation of Delaware
Filed Sept. 30, 1966, Ser. No. 583,289
Int. Cl. H05b 39/04
U.S. Cl. 315—169     8 Claims

ABSTRACT OF THE DISCLOSURE

A display system for obtaining multicolored images comprising a display surface and an electroluminescent material coupled to an excitation source, the voltage and frequency of which are variable to vary the output color of the display surface over a relatively narrow spectrum of output colors. Means are provided for color biasing the display surface, the means comprising an external source of colored light which is projected onto the display surface where it is additively mixed with the variably controllable colors generated by the electroluminescent material. In a preferred embodiment, the colored biasing light is made substantially complementary in color to a color within the range of variably controllable colors.

---

This invention relates generally to multicolor display systems, and omre particularly, to a system for generating multicolor electroluminescent displays wherein an external light source is provided for color biasing the surface of the electroluminescent display, whereby an increased variety of display colors are obtained.

In the past, several methods have been used to provide color displays wherein electroluminescent material was used as the color generating source. However, electroluminescent devices are basically single-colored and in order to obtain multiple colors therefrom it has been required to provide a relatively complex system. Even such complex arrangements which have been developed in the past, provide a rather unsatisfactory multicolor display. One method used in the past has been to combine three separate layers of dissimliar electroluminescent material, each different electroluminescent material selected for the inherent color which it generates. By energizing various points of each layer a mixing of colors occurs, whereby a multicolor display results. However, due to the several layers of material the light intensity of the image output at the surface is reduced due to the filtering effects of the different layers involved. Consequently, the quality of the output colors is substantially reduced.

Another prior art method for providing a multicolor display using electroluminescent material involves the principle of subjective color transformation wherein an image having relatively full spectral content is obtained by the interplay of two monochromatic images of the same object to be displayed. The phenomenon of color transformation occurs when the eye perceives two properly selected and superimposed images of the same object, a long wavelength image and a short wavelength image, which are illuminated by two light sources of different colors. The eye responds by assigning a variety of colors to the combined image apart from the two colors actually present. The various colors and hues and saturations thereof are a product of the eye's response to the interaction of the long and short wavelength images and their intensity patterns. Although only a single layer of electroluminescent material is utilized in such a scheme, it is required to provide, at flicker free rates, alternating patterns of the same image at different wavelengths in order to induce the subjective colors in the eye of the viewer and obtain the desired multicolor effect.

A more recent prior art multicolor display system comprises a surface formed of multiple segments of a translucent substrate material positioned in a manner whereby the substrate segments are viewed edge-on. Each segment has three phosphors thinly deposited thereon, with each such phosphor having a different color generating characteristic. Individual connections are then required for exciting each phosphor of each substrate segment. Although multicolor output is obtainable from such a device certain inherent deficiencies limit the utility thereof. For example, it is extremely difficult to fabricate a display surface of any practical size due to the large number of segments required, each having multiple connections which must be individually controlled. Secondly, the output radiation from such a display device is highly directional. In other words, the output intensity seen by a viewer is a high order function of the viewing angle, and almost perpendicular viewing of the surface is necessary. The deficiencies heretofore mentioned and others of the prior art are eliminated by the subject invention.

Contrasting with such prior art color display systems, the present invention is a very simple device for obtaining multicolored images. In one embodiment of a color display system having a display surface and a variable excitation source, there is provided an illuminating means for providing a colored biasing light which is projected onto the display surface where it is additively mixed with variably controllable colors generated by the display system. The colored biasing light is made substantially complementary in color to a color within the range of variably controllable colors. Multicolored images are produced by an additive color mixing process which occurs at the surface of the display device, not by any subjective reaction process within the eye of the viewer. The output colors obtainable at the display surface are a function of both the frequency and amplitude of the excitation source.

A general property of electroluminescent material is the generation of a relatively narrow spectrum of output colors as a function of excitation frequency. Further, the intensity of the output colors varies as a function of the ampltiude of excitation voltage. One embodiment of the present invention employs such electroluminescent material characteristics in cooperation with an external source of light, which source provides color biasing at the surface of the display device. Thereby, a variety of output colors are obtained as the combination of voltage and frequency excitation is varied and the electroluminescent color output mixes with the bias color. The bias color is made substantially complementary to one of the colors within the range of colors generated by the electroluminescent material in order to obtain the widest possible variety of output colors.

Accordingly, an object of the present invention is to provide a very simple multicolor display system, utilizing a biasing light source, the output colors of which are dependent upon both amplitude and frequency of a system excitation source.

Another object of this invention is to provide an illuminating means in cooperation with an electroluminescent display device wherein such illuminating means provides a colored source of light at the surface of said display device for color mixing thereat and resulting in a wider variety of output colors.

A further object of this invention is to provide a multicolor electroluminescent display system having a plurality of display areas separately connected to a plurality of variable voltage supply sources wherein the output color from each separate area may be controlled by a variable voltage source and, further, to provide a source of bias light at the surface of the display for color mixing thereat and producing a substantial variety of output colors.

Other objects and advantages of the present invention will become apparent and the invention will best be understood from the following description with reference to the accompanying drawings in which.

Figure 1:
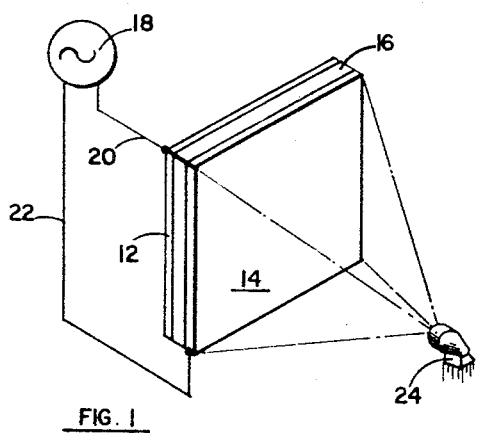
FIGURE 1 is a schematic representation of an embodiment of the invention.

Referring now to FIGURE 1, there is provided an electroluminescent display panel 10 comprising an opaque conductor 12 formed by vacuum deposition of aluminum at the backside of the panel, a transparent conductor 14 of tin oxide, also formed by deposition process at the front surface of the display panel, and a single layer of electroluminescent material 16 situated between the two conductors 12 and 14.

There is also provided a voltage source 18, which is variable in both amplitude and frequency, connected to the conductors 12 and 14 by lines 20 and 22. There is further provided an illumination source 24, external from the display surface, which is shown providing a source of radiation for color biasing the surface 14 of the display device. The color of the biasing light from source 24 may be any color other than those generated by the display panel 10, but for practical reasons, in order to obtain the greatest differentiation of output colors the biasing light should be made substantially complementary to the natural output color of the electroluminescent material 16 used in the panel 10. The inherent color generated by commonly used electroluminescent materials falls within the range of green to blue-green. In such case, the biasing color should be red or some color relatively close to red, and therefore substantially complementary to the natural output color of the electroluminescent panel.

With the source 24 turned on, and in the absence of excitation from the voltage source 18, the display panel will appear the color of such bias source 24, that is, red. Upon excitation of the electroluminescent material, color mixing will occur at the display surface 14 and, depending upon the excitation intensity, that is, the amplitude of the voltage of source 18, the display color will change from that of red to white, and as the intensity of excitation is increased, the display output color will become essentially blue-green. The output color of the electroluminescent display panel 10 is further variable as a function of the frequency of the excitation source 18. As the frequency is decreased the natural color output of the electroluminescent material 16 shifts to the green end of the spectrum, whereas as increase in frequency will push the output color to the blue side of the spectrum.

Figure 2:
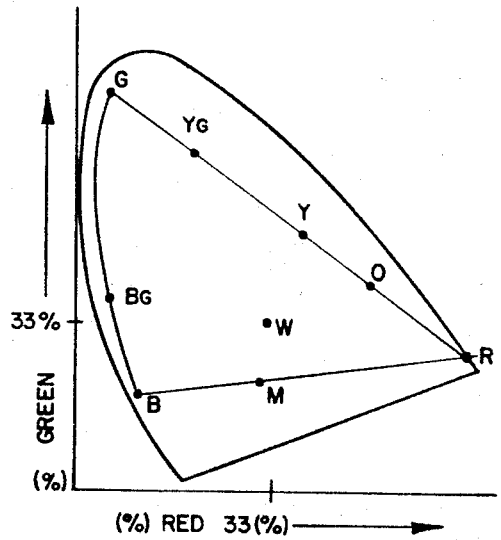
FIGURE 2 depicts the standard chromaticity diagram and indicates the range of variable colors which are generatable by the device of this invention.

As a means of further understanding the various color combinations obtainable as a result of combining the bias color and the variable colored output of the electroluminescent device itself, a description of the standard chromaticity diagram shown in FIGURE 2 follows.

Referring now to FIGURE 2, the chromaticity diagram represents the relation between light wavelength combinations and perceived color. Along the vertical axis is indicated the percent of the color green; along the horizontal axis is indicated the percent of the color red; and the percent of the color blue is the remainder after subtracting the sum of the two indicated percentages from one hundred percent. Point R on the diagram represents the red bias color. White is represented by point W, blue is represented by point B, blue-green by point BG, green by point G, yellow-green by point YG, yellow by point Y, orange by point O, and magenta by point M.

In the operation of the electroluminescent panel 16 of FIGURE 1, the output color seen at the panel surface, in the absence of excitation source 18, is represented by the point R, the bias color emanating from illuminating source 24. As voltage excitation is increased, and beginning at a low frequency level, the output color of the panel 16 would vary along a line passing from point R to point G. In other words, the color output would shift through orange, yellow, and yellowish green, until at high excitation amplitude the color green would be generated. Further color variation is now possible by increasing the output frequency of source 18 while maintaining high voltage excitation. As the frequency is increased, the color output of the surface of the panel 16 will shift along the line shown passing from point G, through point BG to point B, which represents the color blue. At such high frequency excitation, a decrease in the voltage amplitude of source 18 would shift the output color back towards point R passing through point M, which represents the color magenta. The color W is obtained by the combination of equal intensity complementary colors, and in the example under consideration blue-green BG represents the complement of the bias color red R. An intermediate excitation frequency of intermediate amplitude will generate the proper intensity of blue-green, which when mixed with the bias color red will produce a white output color.

It may now be appreciated that any color shown on the chromaticity diagram and located within the substantially triangular area defined by points R, G, and B may be generated at the surface of the display panel 10 merely by altering the amplitude and frequency of the output of excitation source 18, in conjunction with applying a red bias light at such display surface. In the absence of such colored bias light, output colors would only vary in intensity while ranging between points B and G. A display panel designed to simultaneously provide a multitude of output colors is shown in FIGURE 3.

Figure 3:
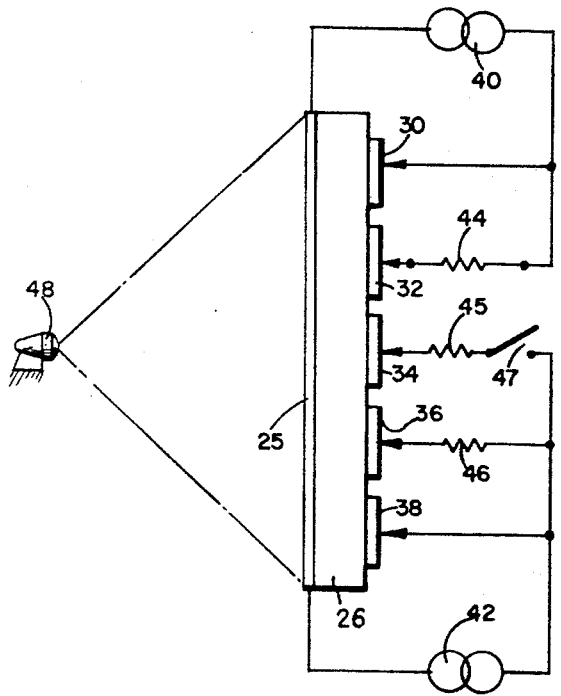
FIGURE 3 is a schematic representation of one embodiment of the present invention wherein the display panel comprises a plurality of separately energized areas.

Referring now to FIGURE 3, there is depicted a simple schematic representation of the present invention, wherein the display panel comprises a plurality of separately energized areas of electroluminescent material. There is provided a transparent conductor 25 at the viewing side of the panel, which covers the total display surface, and a single layer of electroluminescent material 26. There is further provided a plurality of separate, opaque conductors, 30, 32, 34, 36 and 38 covering the electroluminescent material 26 on the rearward side of the panel. As shown, opaque conductors, 30 and 32, are connected to a voltage source 40 and conductors 36 and 38 are connected to a voltage source 42. Both sources 40 and 42 are also connected to transparent conductor 25. Conductor 34 is shown connected to no energizing source. However, by closing switch 47 conductor 34 would be connected to source 42 through a resistor 45. A pair of resistors 44 and 46 are inserted respectively between source 40 and conductor 32 and between source 42 and conductor 36. An illumination source 48 provides, when energized, a red bias light which impinges upon the surface of the display panel.

To provide an example of the multiple output colors available from the arrangement just described, with illumination source 48 providing the color biasing light, it will be assumed that voltage source 40 is energized and provides 200 volts at a frequency of 2000 c.p.s., and that voltage source 42 is energized and provides 200 volts at a frequency of 400 c.p.s. Conductor 30, having substantially no impedance in the connection with source 40, will be strongly excited at a relatively high frequency (2000 c.p.s.) resulting in the generation of a bright, blue-green colored, luminescent output, which will be practically unaffected by the presence of the red bias color. Such display output color corresponds to the point BG in FIGURE 2.

The output color associated with conductor 32 differs from the color due to conductor 30 because of the presence of resistor 44 which reduces the amplitude of the excitation available at conductor 32. The electroluminescent material between conductor 32 and conductor 25 will luminesce and produce a blue-green color, but the intensity thereof will only be of moderate strength and the resulting mixture with the red bias light produces a substantially white output color (point W, FIGURE 2). The area of the display surface opposite conductor 34 will provide an output color (for example, red) corresponding to the bias color emanating from source 48 so long as switch 47 remains open, thereby inhibiting excitation of the associated electroluminescent material.

Further variety of output color is obtained by applying a second source of excitation 42 to conductors 36 and 38. Full source voltage is applied to conductor 38 causing strong excitation of the associated electroluminescent material, and thereby generating a green output color (point G, FIGURE 2) which overrides the red bias color. The insertion of resistor 46 between source 42 and conductor 36 reduces excitation intensity. The resultant subdued greenish luminescence of the associated electroluminescent material mixes with the bias color to produce either a yellow or orange output color (point Y or O, FIGURE 2) at the display surface, depending upon the intensity of the electroluminescent output color. Reference to FIGURE 2 indicates that an increase in excitation voltage will result in a shift of output color in the direction from orange to yellow.

It has therefore been demonstrated, in the foregoing description of FIGURE 3, that by applying various combinations of excitation voltage and frequency to a display panel, containing only a single layer of electroluminescent material, and by adding at the surface of such panel a color biasing light, one can obtain a substantially wider variety of output colors than would otherwise be possible in the absence of such color biasing light.

The following descriptions and figures relate to several aspects of preferred and alternative embodiments of the present invention.

Figure 4:
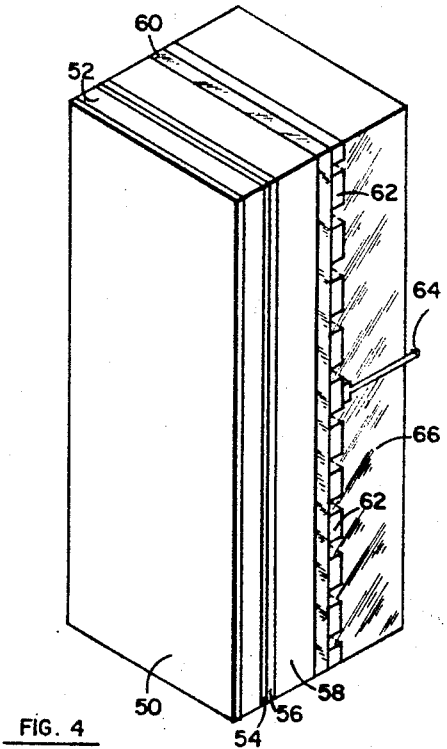
FIGURE 4 is an isometric view of a portion of an electroluminescent display panel for use in a preferred embodiment of the present invention.

Referring now to FIGURE 4, an isometric view shows a cross-sectioned portion of an electroluminescent display panel, or lamp, for use in a preferred embodiment of the present invention. An illumination source for providing a color biasing light at the display surface is not shown in FIGURE 4. Comprising the display panel, there is first provided a light diffusion layer 50 deposited on the surface of a substrate layer 52, of standard glass, for example, which represents the structural support of the display panel. The diffusion layer 50 may be comprised of a thin coating of semitransparent, organic vinyl.

Next to layer 52, a transparent conductor 54, of for example tin oxide, is pyrolytically deposited thereto. An indicial layer 56 is deposited in strips behind the transparent conductor 54, the purpose and function of which will be described more fully in connection with FIGURE 5. The layer 58 of electroluminescent material is located behind the indicial layer 56. A reflective layer 60, of for example barium titinate, is deposited behind the electroluminescent material 58 for enhancing the efficiency of the display panel by permitting lumination to emanate only from the viewing surface 50 thereof.

The opaque electrodes 62, which may be formed of aluminum, are deposited at the back side of the panel. There may be a considerable number of individual electrodes 62, and they may be arranged in any required pattern. Each individual electrode 62 is adapted to be separately connected to an excitation source. For this purpose electrical contacts are provided, of which contact 64 is typical. Completing the arrangement of the display panel, a potting, or encapsulation, layer 66 of epoxy is shown covering the opaque electrodes at the back side of the panel. The function of this encapsulation layer 66 is to insulate the various layers from moisture and to further add to the structural support of the panel.

Figure 5:
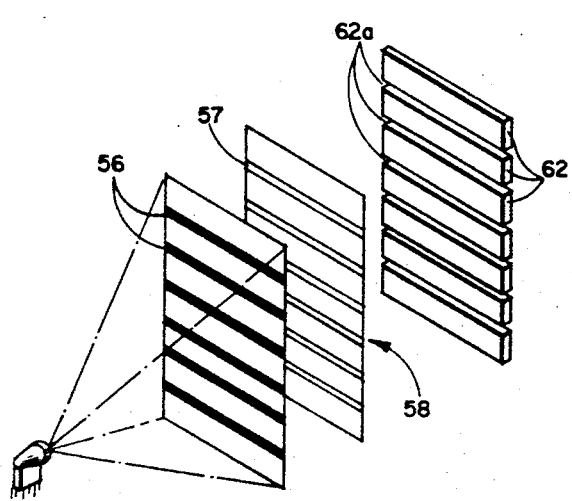
FIGURE 5 is an exploded view of a few of the elements which make up the display panel of FIGURE 4.

Referring now to FIGURE 5, there is shown an exploded view of some of the elements which make up the display panel and particularly depicts the purpose of the indicial layer 56 shown in FIGURE 4. Opaque electrodes 62 are shown arranged with interspaces 62a between individual electrodes. The areas 57 of electroluminescent material 58 directly in front of such interspaces will not become energized and thus do not luminesce. An indicial layer 56, containing strips of black color-absorbing material, for example flat black lacquer, is inserted in front of the electroluminescent material 58. The absorbing strips 56 are made to register with the interspaces 62a between opaque electrodes 62. Bias light from source 68 encounters no luminescent color with which to mix at display surface areas corresponding to the interspaces between electrodes 62. The indicial layer 56 absorbs the bias light at such strip areas and prohibits such light from reflecting back to the surface of the panel.

Figure 6:
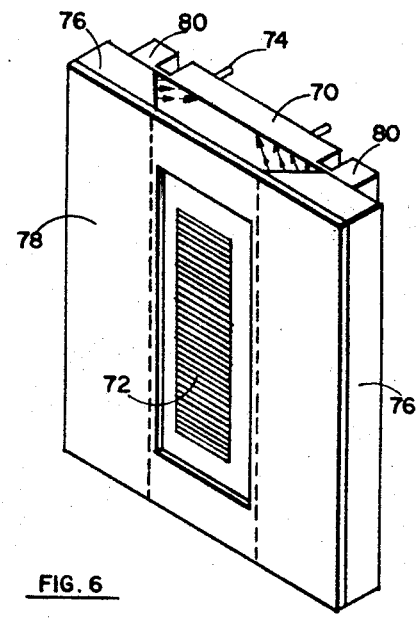
FIGURE 6 is an isometric view of an embodiment of the present invention showing means for providing colored bias light by use of edge lighting panels.
Figure 7:
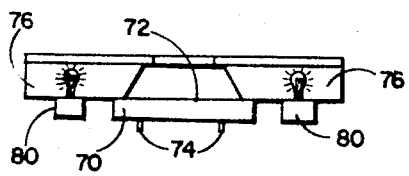
FIGURE 7 is a schematic end view showing the embodiment represented in FIGURE 6.

Referring now to FIGURES 6 and 7, there are shown respectively an isometric view and an end view of an embodiment of the present invention, indicating one possible means for providing bias light at the surface of the display panel by use of edge lighting panels. There is provided an electroluminescent lamp 70 substantially similar to the lamp described in conjunction with FIGURE 4, having a display surface 72, and a plurality of electrical contacts 74 at the backside thereof.

To provide a color biasing light having substantially a uniform intensity over the display surface of the electroluminescent panel, two strips or panels 76 of an acrylic type, translucent material are positioned, as shown, on opposite sides of the display surface 72. A frame 78 is shown mounted on the front of the display unit and contains a window through which the display surface 72 can be viewed. A plurality of individual edge lights 80, more clearly seen in FIGURE 7, are located along the length of both translucent panels 76 within cavities formed therein.

The illumination from bias lights 80 is transmitted throughout the panels 76, which have a diagonally formed edge facing the display surface 72. The colored bias light radiates from the diagonal edge of the translucent material 76 upon the display surface 72 and provides for additive mixing thereat with the various luminescent colors generated by the electroluminescent lamp 70.

Figure 8:
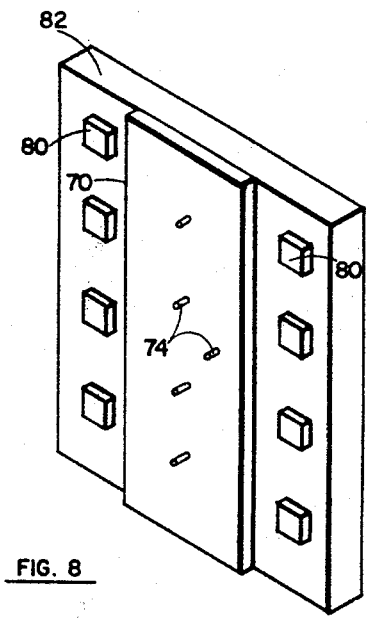
FIGURE 8 is an isometric rear view showing an alternate embodiment of the present invention.

Referring to FIGURE 8, there is shown an isometric rear view of an alternative embodiment of the present invention which provides another means for obtaining the color biasing light at the surface of the display panel. In this embodiment there is provided an integral unit comprising the electroluminescent lamp 70 with electrodes 74, and a solid acrylic substrate layer 82 forming the frontal surface of the display unit. Edge lights 80, provide the bias color which uniformly radiates throughout the front layer 82 of the display surface. Such an arrangement provides maximum simplicity of construction for the display system of the present invetnion, and also provides the most uniformly intense color biasing light for mixing at the display surface with the electroluminescent radiation. Not shown in FIGURE 8 is a frontal structural member, having a window the size of the electroluminescent lamp 70 therein, which hides from view the sides of layer 82 extending beyond the electroluminescent lamp 7.

Although the invention has been described and illustrated in detail, it is to be understood that the same is by way of illustration and example only, and is not to be taken by way of limitation; the spirit and scope of this invention being limited only by the terms of the appended claims.

I claim:
1. A color display system comprising in combination:
   first means including an electroluminescent layer responsive to electrical signals for generating light having a range of colors, said first means further including a display surface from which said colors emanate;
   a variable excitation source operatively coupled to said electroluminescent layer for affecting the color output thereof; and
   second means for color biasing said display surface, said second means comprising:
      a source of radiation, the color of said radiation being outside the range of colors of said electroluminescent layer, said colored radiation being projected onto said display surface.

2. A color display system according to claim 1 wherein said second means further comprises:
   means for projecting said colored radiation onto said display surface.

3. A color display system according to claim 1 wherein said first means further comprises:
   conductor means disposed on both sides of said electroluminescent layer for generating electrical fields within said layer, said conductor means being disposed substantially parallel to said layer, said variable excitation source being operatively coupled to said conductor means.

4. A color display system according to claim 3 wherein said variable excitation source is operative to generate electrical signals having variable frequencies and voltage amplitudes for varying the color output of said electroluminescent layer.

5. A color display system according to claim 1 wherein the color of said radiation is substantially complementary to a color within said range of colors.

6. A color display system according to claim 5 wherein said first means further comprises:
   conductor means disposed on opposite surfaces of said electroluminesuent layer; and wherein said variable excitation source is opeartive to generate a plurality of amplitude modulated electrical signals for varying the intensity of light from said electroluminescent layer at a plurality of locations along the surface thereof, said plurality of electrical signals being variable in frequency for varying the color of said light from said electroluminescent layer at said plurality of locations.

7. A color display system according to claim 5 wherein said first means further comprises:
   a transparent conductor disposed on one surface of said electroluminescent layer between said layer and said display surface; and
   a plurality of opaque conductors located on an opposite surface of said electroluminescent layer for providing separate excitation of individual areas of said layer; and wherein said variable excitation source comprises:
      means for generating at least one signal having a variable frequency and voltage amplitude, said signal being applied to said transparent conductor and to each of said plurality of opaque conductors; and
      means for varying either one or both of the amplitude and frequency of said signal for generating multicolored illumination from said electroluminescent layer, said colored radiation additively mixing with said multicolored illumination at said display surface.

8. A color display system according to claim 7 wherein said first means further comprises:
   reflective layer means interposed between said plurality of opaque conductors and said electroluminescent layer for directing light generated by said electroluminescent layer towards said display surface; and
   a layer of material interposed between said transparent conductor and said electroluminescent layer, said layer of material comprising a plurality of regularly spaced, light absorbing portions, said light absorbing portions being located to match the spaces between said plurality of opaque conductors.

References Cited

UNITED STATES PATENTS

| | | | |
|---|---|---|---|
| 2,928,993 | 3/1960 | Liebson | 315—169 |
| 3,247,390 | 4/1966 | Kazan | 250—213 |
| 3,344,280 | 9/1967 | Martel | 250—213 |

JOHN W. HUCKERT, *Primary Examiner.*

R. SANDLER, *Assistant Examiner.*

U.S. Cl. X.R.

178—5.4